(12) United States Patent
Kamiya et al.

(10) Patent No.: US 8,549,847 B2
(45) Date of Patent: Oct. 8, 2013

(54) EXHAUST GAS PURIFYING DEVICE

(75) Inventors: Shohei Kamiya, Kasumigaura (JP);
Tomoyuki Saito, Kasumigaura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 428 days.

(21) Appl. No.: 12/936,522

(22) PCT Filed: Jul. 7, 2009

(86) PCT No.: PCT/JP2009/062348
§ 371 (c)(1),
(2), (4) Date: Oct. 6, 2010

(87) PCT Pub. No.: WO2010/018722
PCT Pub. Date: Feb. 18, 2010

(65) Prior Publication Data
US 2011/0030353 A1    Feb. 10, 2011

(30) Foreign Application Priority Data
Aug. 11, 2008   (JP) ................. 2008-206956

(51) Int. Cl.
*F01N 3/10* (2006.01)
(52) U.S. Cl.
USPC .............................. 60/299; 60/297
(58) Field of Classification Search
USPC .......................................... 60/299
See application file for complete search history.

(56) References Cited

U.S. PATENT DOCUMENTS

| | | | |
|---|---|---|---|
| 2003/0097834 A1 | 5/2003 | Gabe et al. | |
| 2003/0146819 A1* | 8/2003 | Shibayama | 338/22 R |
| 2007/0289293 A1* | 12/2007 | Kerchner et al. | 60/295 |

FOREIGN PATENT DOCUMENTS

| | | | |
|---|---|---|---|
| EP | 1 312 776 A2 | 5/2003 | |
| EP | 1 722 088 A2 | 11/2006 | |
| JP | 3-26651 U | 3/1991 | |
| JP | 11-159326 A | 6/1999 | |
| JP | 11-304829 A | 11/1999 | |
| JP | 2003-20931 A | 1/2003 | |
| JP | 2003-120277 A | 4/2003 | |
| JP | 2003-148141 A | 5/2003 | |
| JP | 2004353508 A | * 12/2004 | |
| JP | 2005-16374 A | 2/2005 | |

(Continued)

OTHER PUBLICATIONS

English Translation of JP 11-159326 A.*

(Continued)

*Primary Examiner* — Thomas Denion
*Assistant Examiner* — Jason Shanske
(74) *Attorney, Agent, or Firm* — Mattingly & Malur, PC

(57) ABSTRACT

A support member (40) is provided on a cylindrical member (23) of an upstream cylinder (22). A connector portion (34C) of a first temperature detector (34) for detecting the temperature of exhaust gas flowing into an oxidation catalyst (25), a connector portion (35C) of a second temperature detector (35) for detecting the temperature of the exhaust gas flowing into a particulate matter removing filter (31), and a sensor portion (39A) of a pressure detector (39) for detecting the front and rear pressures of the particulate matter removing filter (31) are arranged to be mounted on this support member (40). Accordingly, the support member (40) is capable of supporting the connector portions (34C, 35C) of the temperature detectors (34, 35) and the sensor portion (39A) of the pressure detector (39) in one location in a concentrated manner, so that harnesses on a controller side can be easily connected thereto.

6 Claims, 12 Drawing Sheets

(56) References Cited

FOREIGN PATENT DOCUMENTS

| JP | 2005-120839 A | 5/2005 |
|---|---|---|
| JP | 2005-194949 A | 7/2005 |
| JP | 2005-256627 A | 9/2005 |
| JP | 2006-316744 A | 11/2006 |
| JP | 2007-2774 A | 1/2007 |
| WO | 2008/136203 A1 | 11/2008 |

OTHER PUBLICATIONS

English Translation of JP 11-159326 A, Jun. 15, 1999.*

* cited by examiner

EXHAUST GAS PURIFYING DEVICE

TECHNICAL FIELD

The present invention relates to an exhaust gas purifying device suitable for use in removing harmful substances in exhaust gas emitted from, for example, an engine.

BACKGROUND ART

Generally, a construction machine such as a hydraulic excavator is constituted by an automotive lower traveling structure, an upper revolving structure which is swingably mounted on the lower traveling structure, and a working mechanism liftably mounted on the front side of the upper revolving structure. An engine for driving a hydraulic pump is mounted on a rear portion of a revolving frame of the upper revolving structure, and an exhaust gas purifying device for purifying exhaust gas by removing harmful substances in the exhaust gas is provided in an exhaust pipe of the engine.

Further, as an exhaust gas purifying device which is provided in a hydraulic excavator, a device is known which has an oxidation catalyst for removing by oxidation carbon monoxide (CO) and hydrocarbons (HC) in the exhaust gas, a particulate matter removing filter (generally called a diesel particulate filter, abbreviated as DPF) for capturing and removing particulate matter (PM) in the exhaust gas (Patent Literature 1: Japanese Patent Laid-Open No. 2003-120277 A).

The exhaust gas purifying device according to this Patent Literature 1 is largely constituted by connecting in series an upstream cylinder connected to the exhaust pipe of an engine, a downstream cylinder which is disposed downstream of the upstream cylinder and from which exhaust gas is discharged, and an intermediate cylinder provided between the upstream cylinder and the downstream cylinder. The aforementioned oxidation catalyst, particulate matter removing filter, and the like are accommodated in such as the intermediate filter.

Here, as for the oxidation catalyst provided in the exhaust gas purifying device, the exhaust gas needs to be adjusted to a predetermined temperature in order to effect appropriate oxidation treatment. In addition, since the captured particulate matter becomes clogged due to the deposition of the captured particulate matter, the captured particulate matter is removed by burning it at a stage when a predetermined amount has accumulated.

For this reason, the exhaust gas purifying device is provided with a temperature detector for detecting the temperature of the exhaust gas flown toward the oxidation catalyst, a temperature detector for detecting the temperature of the exhaust gas flown toward the particulate matter removing filter, and a pressure detector for detecting the front and rear pressures of the particulate matter removing filter through respective conduits to measure the amount of particulate matter accumulated (Patent Literature 2: Japanese Patent Laid-Open No. 2005-256627 A).

The two temperature detectors and the pressure detector which are provided in the exhaust gas purifying device are adapted to output the detected temperature and the detected pressure to a controller, respectively, and harnesses linked to the controller are connected to connector portions provided in the respective temperature detectors and the pressure detector.

Thus, in the exhaust gas purifying device in accordance with Patent Literature 2, since two temperature detectors and one pressure detector are provided, when the exhaust gas purifying device is assembled to the vehicle body side, the controller side harnesses must be connected to the connector portions of three detectors in total. However, since the respective detectors are disposed in a dispersed manner on the exhaust gas purifying device in its entirety, much time is necessary in the connection operation of the harnesses. Since numerous equipments, piping, and the like are present particularly in the surroundings of the engine where the exhaust gas purifying device is provided, it is difficult to perform the operation by avoiding such equipments, piping, and the like, so that there is a problem in that assembly workability declines.

Moreover, the conduits disposed on the outer peripheral sides of the respective cylinders unfavorably serve as obstacles when the cylinders are separated and moved in order to perform the cleaning operation of the particulate matter removing filter. For this reason, in cases where the cleaning operation of the particulate matter removing filter is carried out, the conduits must be removed, so that there is a problem in that the operational efficiency deteriorates.

DISCLOSURE OF THE INVENTION

In view of the above-described problems with the conventional art, it is an object of the present invention to provide an exhaust gas purifying device which, even in the case where the temperature detectors and the pressure detector are provided, allows the harness connection operation with respect to them to be carried out easily.

Means for Solving the Problems (1) An exhaust gas purifying device in accordance with the present invention comprises an upstream cylinder connected to an exhaust pipe of an engine mounted on a vehicle body and accommodating an oxidation catalyst for performing oxidation treatment of harmful substances contained in exhaust gas; a downstream cylinder disposed downstream of the upstream cylinder to emit the exhaust gas; a filter cylinder provided between the upstream cylinder and the downstream cylinder and accommodating a filter for capturing particulate matter contained in the exhaust gas; a temperature detector mounted on the upstream cylinder and constituted by a sensor portion for detecting the temperature of the exhaust gas and a connector portion provided at a distal end portion of a harness extending from the sensor portion; an upstream side conduit which has a base end connected to the upstream cylinder and through which pressure within the upstream cylinder is led; a downstream side conduit which has a base end connected to the downstream cylinder and through which pressure within the downstream cylinder is led; and a pressure detector provided by being connected to a distal end of the upstream side conduit and to a distal end of the downstream side conduit so as to detect front and rear pressures of the filter.

Further, to overcome the above-described problems, a characteristic feature of the construction adopted in the present invention lies in that a support member for supporting the connector portion of the temperature detector and the pressure detector in one location in a concentrated manner is arranged to be provided on the upstream cylinder.

With this construction, the connector portion of the temperature detector and the pressure detector can be mounted together on the support member provided on the upstream cylinder. Accordingly, the connector portion of the temperature detector and the pressure detector can be disposed in one location in a concentrated manner by use of the support member.

As a result, when the respective cylinders are installed on the vehicle body side, harnesses on the controller side provided on the vehicle body can be easily connected to the connector portion of the temperature detector and the pressure detector which are disposed in one location in the concentrated manner, thereby making it possible to improve the assembly workability.

(2) According to the present invention, the support member is arranged to be provided on an outer peripheral side of the upstream cylinder by being located upstream of a position of the oxidation catalyst. Generally, since the oxidation catalyst performs oxidation treatment of the exhaust gas at a high temperature, the temperature becomes high downstream of this oxidation catalyst. To cope with this, according to this construction, since the support member is disposed upstream of the position of the oxidation catalyst, the connector portion of the temperature detector and the pressure detector can be disposed in that range of the upstream cylinder where the temperature is low. In consequence, it is possible to prevent the thermal degradation of the connector portion of the temperature detector and the pressure detector and prolong their service lives.

(3) According to the present invention, the temperature detector comprises a first temperature detector for detecting the temperature of the exhaust gas flowing into the oxidation catalyst and a second temperature detector for detecting the temperature of the exhaust gas flowing into the filter after passing through the oxidation catalyst, and the support member is adapted to support a connector portion of the first temperature detector and a connector portion of the second temperature detector.

With this construction, the temperature of the exhaust gas flowing into the oxidation catalyst can be detected by the first temperature detector, and the temperature of the exhaust gas flowing into the filter after passing through the oxidation catalyst can be detected by the second temperature detector. As a result, as the temperature of the exhaust gas is controlled on the basis of a detection value of the first temperature detector, it is possible to efficiently remove harmful substances such as carbon monoxide (CO) and hydrocarbons (HC) contained in the exhaust gas by the oxidation catalyst. In addition, as the temperature of the exhaust gas is controlled on the basis of a detection value of the second temperature detector, it is possible to efficiently burn and remove particulate matter deposited on the filter.

Further, since the connector portion of the first temperature detector and the connector portion of the second temperature detector can be supported together by the support member, harnesses on the vehicle body side can be easily connected to these connector portions.

(4) According to the present invention, the downstream side conduit is arranged to extend from the downstream cylinder to the upstream cylinder while being routed along an outer peripheral side of the filter cylinder. As a result, the downstream side conduit, which extends from the downstream cylinder to the upstream cylinder while being routed along the outer peripheral side of the filter cylinder, is able to lead the pressure on the downstream side of the filter to the pressure detector supported by the support member on the upstream cylinder.

(5) In addition, according to the present invention, the downstream side conduit is arranged to be disposed at a position offset from a moving path which is used when the filter cylinder is dismounted from the upstream cylinder and the downstream cylinder and is moved to another location or is returned from the other location so as to perform maintenance operation of the filter cylinder.

With this construction, since the filter cylinder can be mounted and dismounted with respect to the upstream cylinder and the downstream cylinder, it is possible to remove only the filter cylinder with the upstream cylinder and the downstream cylinder installed as they are on the vehicle body side. As a result, the dismounted filter cylinder can be easily moved to another location, so that it is possible to easily perform the maintenance operation of the filter, including the inspection operation, cleaning operation, repair operation, and the like at this location.

Further, although the filter cylinder is moved to perform the maintenance operation of the filter, in this case the downstream side conduit, which extends from the downstream cylinder to the upstream cylinder while being routed along the outer peripheral side of the filter cylinder, is disposed at a position offset from the moving path which constitutes a passage when the filter cylinder is moved. Accordingly, even in cases where the filter cylinder is mounted and dismounted for the purpose of maintenance operation, the downstream side conduit does not serve as an obstacle, and there is no need to remove this downstream side conduit.

As a result, even in a case where the exhaust gas purifying device is accommodated in a narrow space, only the filter cylinder can be easily mounted to and dismounted from the upstream cylinder and the downstream cylinder, so that it is possible to easily perform the maintenance operation of the filter accommodated in the filter cylinder.

(6) Meanwhile, according to the present invention, the upstream cylinder can be constituted by one cylindrical member, an inlet pipe which is provided upstream of the cylindrical member and to which the exhaust pipe is connected, and the oxidation catalyst provided in the cylindrical member by being located downstream of the inlet pipe, and the support member can be arranged to be disposed on an outer peripheral side of the cylindrical member by being located upstream of the oxidation catalyst.

With this construction, the upstream cylinder can be formed by providing the inlet pipe on the upstream side of one cylindrical member and by accommodating the oxidation catalyst on the downstream side of this inlet pipe. The support member can be provided at that position on the upstream side of the cylindrical member where the temperature is low, and the connector portions of the temperature detectors and the pressure detector can be disposed on this support member in one location in a concentrated manner. In addition, since the upstream cylinder is provided with the inlet pipe and the oxidation catalyst on and in one cylindrical member, it is possible to reduce the number of parts, thereby making it possible to improve the assembly workability, maintenance workability, and the like.

(7) Furthermore, according to the present invention, the upstream cylinder can be constituted by two cylindrical members, an inlet pipe which is provided on a first cylindrical member located on an upstream side between the two axially connected cylindrical members and to which the exhaust pipe is connected, and the oxidation catalyst provided in a second cylindrical member located on a downstream side, and the support member can be arranged to be disposed on an outer peripheral side of the first cylindrical member.

With this construction, the upstream cylinder can be formed by providing the inlet pipe on the first cylindrical member located on the upstream side, accommodating the oxidation catalyst in the second cylindrical member located on the downstream side, and connecting the first cylindrical member and the second cylindrical member in the axial direction. Further, the connector portions of the temperature detectors and the pressure detector can be disposed in one location in a concentrated manner on the support member provided on the first cylindrical member which is at a position where the temperature is low. In addition, only the second cylindrical member can be removed from the first cylindrical member disposed as it is on the vehicle body side, and it is therefore possible to easily perform, for instance, the maintenance operation of the oxidation catalyst.

DESCRIPTION OF REFERENCE NUMERALS

Figure 1:
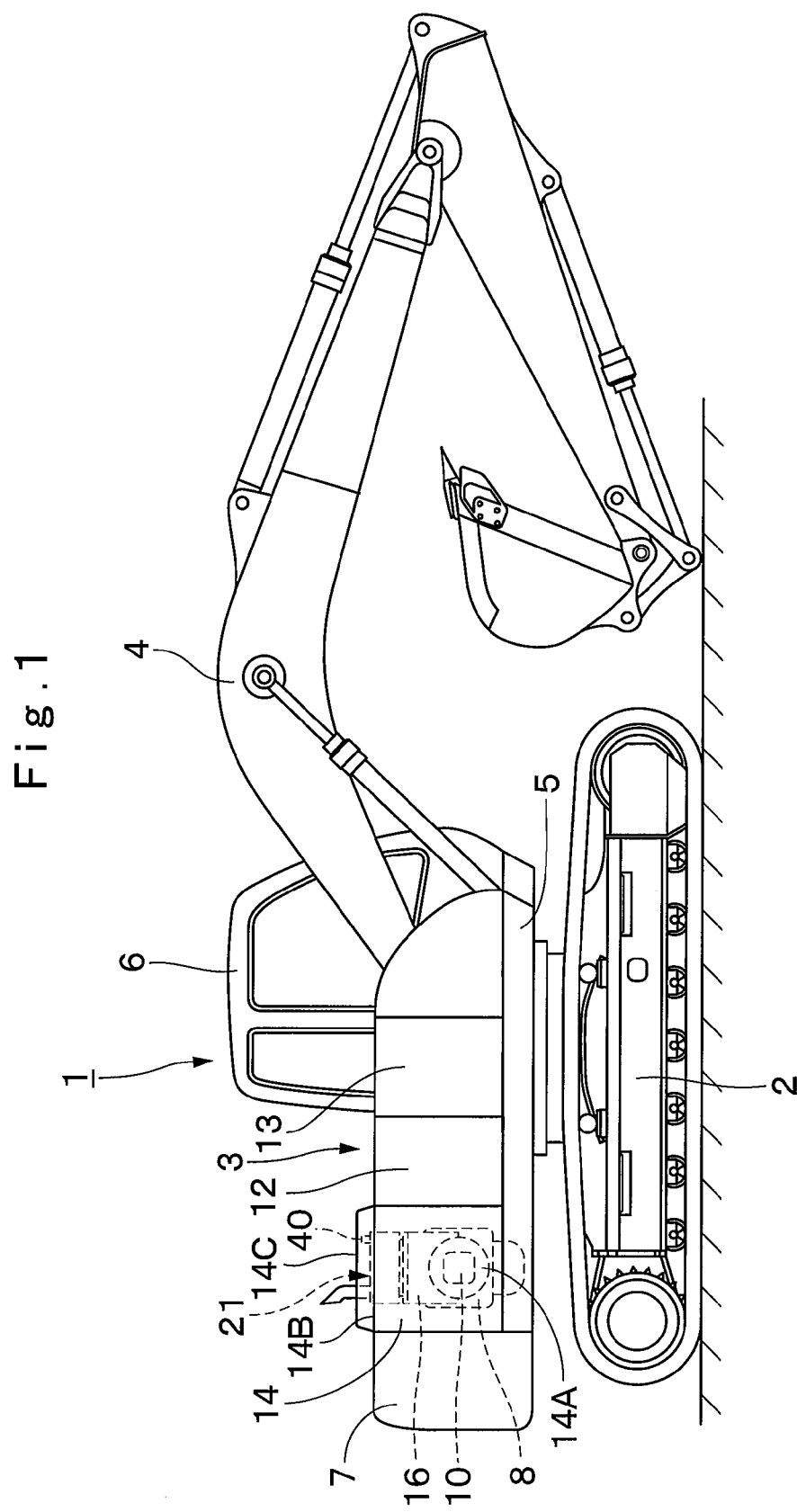
FIG. 1 is a front view illustrating a hydraulic excavator equipped with an exhaust gas purifying device in accordance with a first embodiment of the invention.

1: Hydraulic excavator
2: Lower traveling structure (vehicle body)
3: Upper revolving structure (vehicle body)
8: Engine
8E: Exhaust pipe
10: Hydraulic pump
16: Purifying device mount
21, 51: Exhaust gas purifying device
22, 52: Upstream cylinder
23, 27, 30: Cylindrical member
23A, 27A, 30A, 53A, 54A: Cylindrical portion
23B, 27B, 53B: Lid portion
23C, 27C, 53C: Flange portion
23D, 27D, 53D: Support leg
23E, 54D: First temperature detector mounting portion
23F, 54E: Second temperature detector mounting portion
23G, 54F: Upstream side pressure pick out portion 24: Inlet pipe
25: Oxidation catalyst
26: Downstream cylinder
27E: Downstream side pressure pick out portion
28: Outlet pipe
29: Filter cylinder
30B, 54B: Front side flange portion
30C, 54C: Rear side flange portion
31: Particulate matter removing filter
33: Moving path
34: First temperature detector
34A, 35A, 39A: Sensor portion
34B, 35B: Harness
34C, 35C, 39B: Connector portion
34D, 35D, 39C: Bracket
35: Second temperature detector
36: Pressure detecting means
37: Upstream side conduit
38: Downstream side conduit
39: Pressure detector
40: Support member
40A: Vertical plate
40B: Mounting portion
53: First cylindrical member
54: Second cylindrical member

BEST MODE FOR CARRYING OUT THE INVENTION

Hereafter, an exhaust gas purifying device in accordance with an embodiment of the present invention is described more particularly with reference to the accompanying drawings, by citing as an example a case in which the exhaust gas purifying device is mounted on a hydraulic excavator.

FIGS. 1 to 11 show a first embodiment of the exhaust gas purifying device in accordance with the present invention.

In FIG. 1, designated at 1 is a crawler type hydraulic excavator as a construction machines, and the hydraulic excavator 1 is largely constituted by an automotive lower traveling structure 2, an upper revolving structure 3 which is swingably mounted on the lower traveling structure 2 and constitutes a vehicle body together with the lower traveling structure 2, and a working mechanism 4 liftably mounted on the front side of the upper revolving structure 3 to perform such as the operation of excavating earth and sand. The lower traveling structure 2 and the upper revolving structure 3 are specific examples of the vehicle body in accordance with the invention.

Here, a detailed description will be given of the upper revolving structure 3 for constituting the hydraulic excavator 1. Designated at 5 is a revolving frame of the upper revolving structure 3, and the revolving frame 5 is constructed as a support structure. The working mechanism 4 is liftably mounted on the front side of the revolving frame 5 by being located in the center in the left and right directions, and a below-described engine 8 and the like are provided on the rear side thereof.

Indicated at 6 is a cab which is mounted on the left front side of the revolving frame 5 (on the left side of a foot portion of the working mechanism 4) and in which an operator rides. Disposed in its interior are an operator's seat in which the operator is seated, an operation lever for traveling, an operation lever for work operation, and the like (none are shown).

Indicated at 7 is a counterweight which is mounted on a rear end portion of the revolving frame 5. This counterweight 7 is for keeping a weight balance with the working mechanism 4 and projects such that its rear surface side is curved, as shown in FIG. 2.

Denoted at 8 is an engine which is provided on the rear side of the revolving frame 5. The engine 8 is mounted in a transversely mounted state in which it extends in the left and right directions by being located on the front side of the counterweight 7. A cooling fan 8A for supplying cooling air to below-described heat exchanger 9 is provided on the left side of the engine 8.

Figure 2:
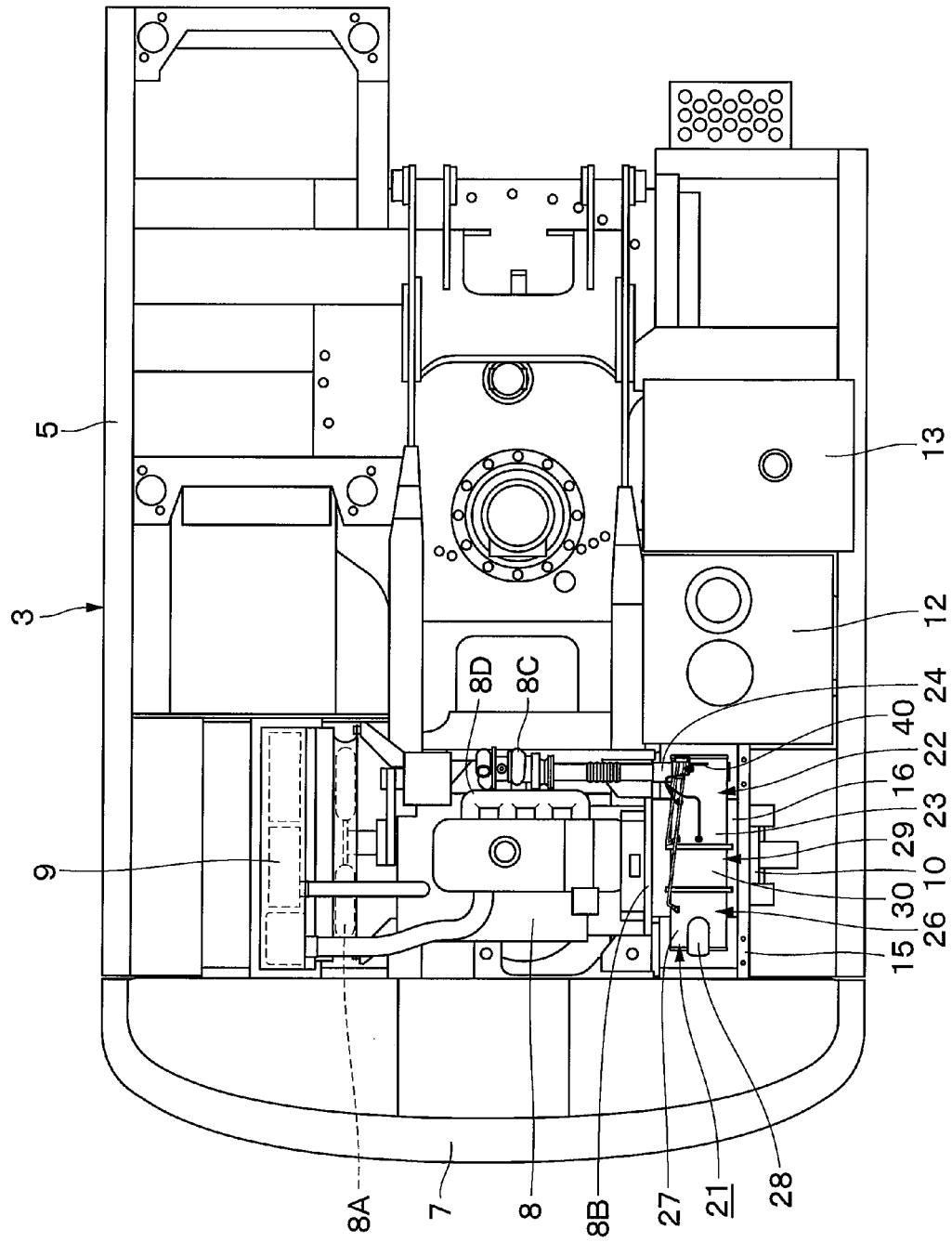
FIG. 2 is a plan view illustrating in enlarged form an upper revolving structure of the hydraulic excavator with a cab, a housing cover, and the like omitted.
Figure 3:
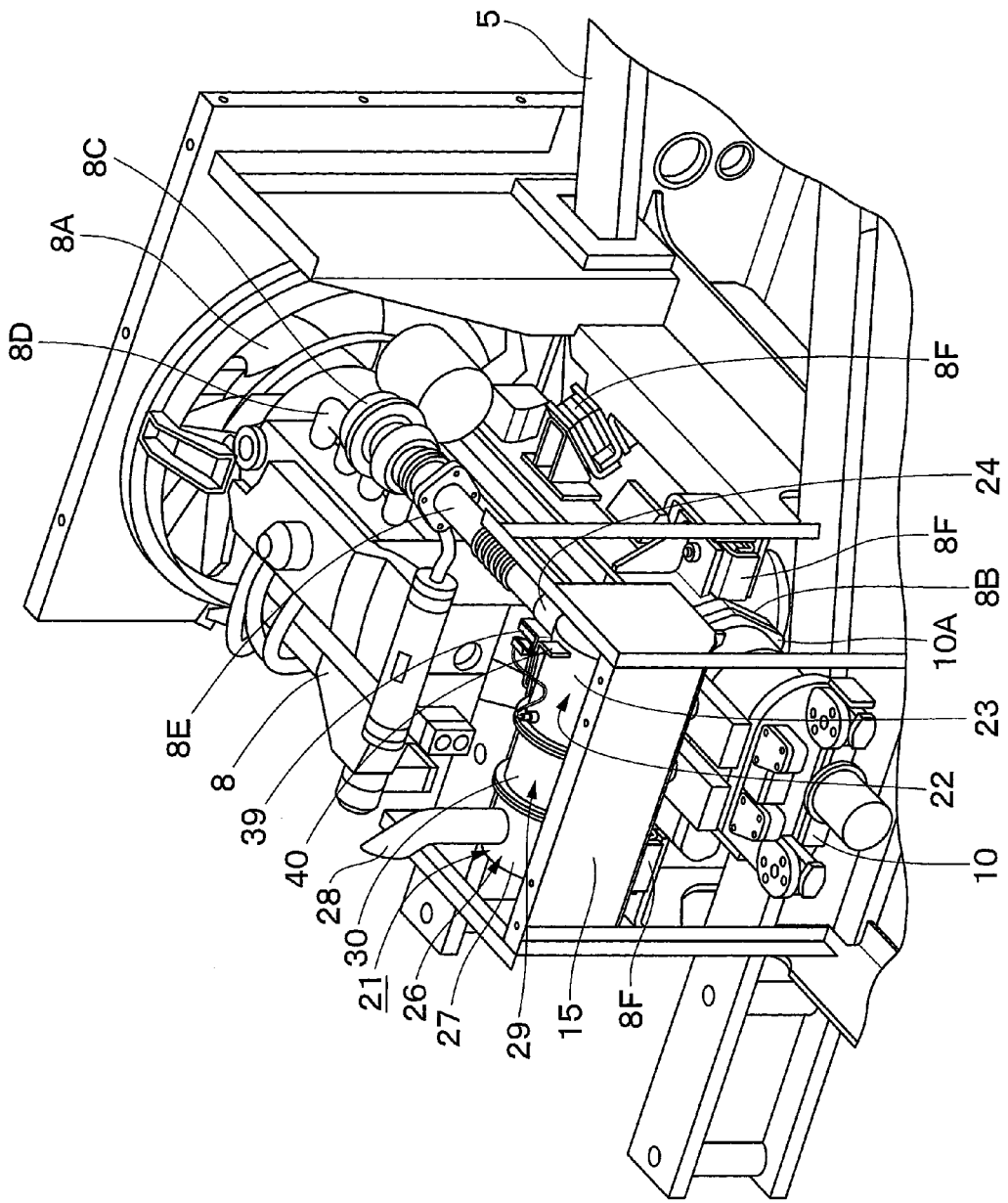
FIG. 3 is a perspective view illustrating the exhaust gas purifying device in accordance with the first embodiment together with an engine, parts of a revolving frame, and a partition member.
Figure 4:
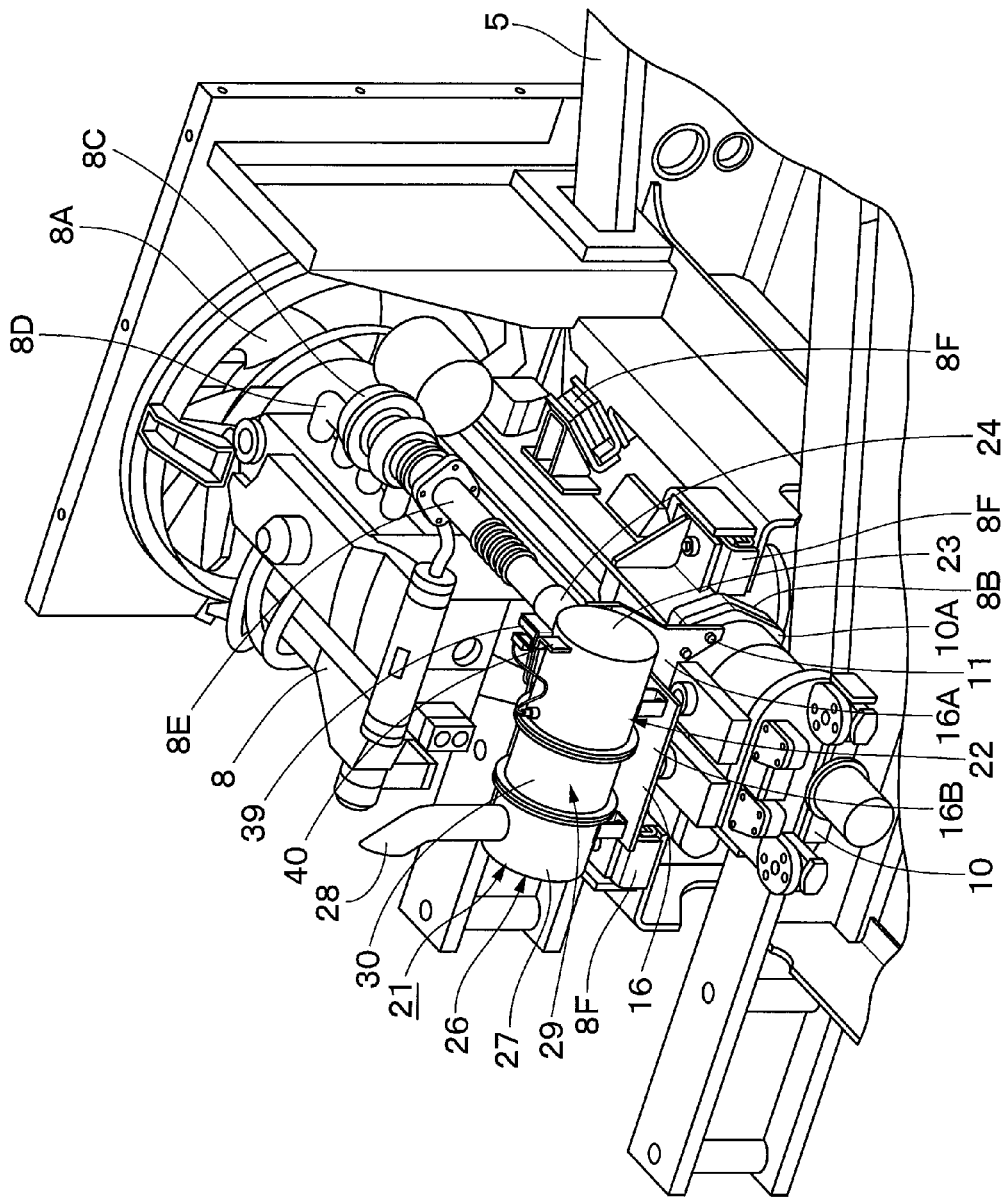
FIG. 4 is a perspective view illustrating the exhaust gas purifying device in accordance with the first embodiment together with the engine and the parts of the revolving frame in a state in which the partition member is omitted.

Meanwhile, as shown in FIGS. 2 to 4, the right side, namely, one longitudinal end, of the engine 8 is formed as a pump mounting portion 8B for mounting a below-described hydraulic pump 10. A supercharger 8C such as a turbocharger for increasing the flow rate of intake air is provided on an upper portion of the front side of the engine 8 by being connected to an exhaust manifold 8D, and an exhaust pipe 8E is connected to the supercharger 8C in such a manner as to extend in the left and right directions. Further, the engine 8 is supported by the revolving frame 5 in a vibration isolated state by means of, for example, four vibration isolating members 8F (only three are shown in FIGS. 3 and 4).

Indicated at 9 is the heat exchanger disposed on the left side of the engine 8, and the heat exchanger 9 is provided in face-to-face relation to the cooling fan 8A. This heat exchanger 9 is constituted by such as a radiator for cooling engine cooling water, an oil cooler for cooling operating oil, and an intercooler for cooling the air which is sucked for the engine 8.

Denoted at 10 is the hydraulic pump disposed on the right side of the engine 8, and the hydraulic pump 10 is driven by the engine 8 to thereby deliver operating oil supplied from a below-described operating oil tank 12 as pressurized oil. Further, as shown in such as FIGS. 3 and 4, a flange portion 10A is formed on the base end side of the hydraulic pump 10, and this flange portion 10A is fixed to the pump mounting portion 8B of the engine 8 by using a plurality of bolts 11.

Indicated at 12 is the operating oil tank (see FIG. 2) which is mounted on the right side of the revolving frame 5 by being located on the front side of the hydraulic pump 10. This operating oil tank 12 stores operating oil for driving the lower traveling structure 2, the working mechanism 4, and the like. Additionally, a fuel tank 13 is disposed on the front side of the operating oil tank 12.

Denoted at 14 is a housing cover (see FIG. 1) for covering the engine 8, the heat exchanger 9, a below-described exhaust gas purifying device 21, and the like. The housing cover 14 is largely constituted by a left side cover (not shown) covering a side of the heat exchanger 9 by being located on the left side of the upper revolving structure 3, a right side cover 14A covering a side of the hydraulic pump 10 by being located on the right side of the upper revolving structure 3, and a top cover 14B covering the upper side of the engine 8 and the like. An engine cover 14C is openably provided at the top cover 14B so as to close an opening (not shown) for maintenance operation.

Denoted at 15 is the partition member (see FIGS. 2 and 3) which is provided on the right side of the engine 8 by being located within the housing cover 14. The partition member 15 is generally called a firewall and is installed on structures such as the revolving frame 5, the housing cover 14, and the like. Further, as the partition member 15 partitions the interior of the housing cover 14 into an engine side space where the engine 8, the exhaust gas purifying device 21, and the like are disposed and a pump side space where the hydraulic pump 10 is disposed, the partition member 15 prevents leaked operating oil from scattering to the engine 8 side even in cases where leakage of the operating oil has occurred in the surroundings of the hydraulic pump 10.

Designated at 16 is a purifying device mount 16 which is provided on the right side of the engine 8 by being located on the upper side of the hydraulic pump 10. As shown in FIG. 4, this purifying device mount 16 is for mounting the below-described exhaust gas purifying device 21 to the engine 8 side. In this case, the purifying device mount 16 is constituted by a vertical plate portion 16A located on the left side, namely, the engine 8 side, and extending substantially vertically and by a lateral plate portion 16B extending from the vertical plate portion 16A substantially horizontally in a rightward direction. Further, the vertical plate portion 16A of the purifying device mount 16 together with the flange portion 10A of the hydraulic pump 10 is fixed to the pump mounting portion 8B of the engine 8 serving as the vehicle body side, by use of the bolts 11.

Next, the exhaust gas purifying device 21 in accordance with the first embodiment for purifying exhaust gas by removing harmful particulate matter (PM) contained in the exhaust gas of the engine 8 is described more particularly with reference to FIGS. 2 to 11.

Namely, designated at 21 is the exhaust gas purifying device in accordance with the first embodiment which is connected to the exhaust pipe 8E by being located on the upper right side of the engine 8. This exhaust gas purifying device 21 removes particulate matter contained in the exhaust gas flowing through the exhaust pipe 8E. The exhaust gas purifying device 21 is disposed in a longitudinally mounted state such that its front side in the front and back directions (operating oil tank 12 side), for instance, constitutes an upstream side and its rear side (counterweight 7 side) constitutes a downstream side. Further, the exhaust gas purifying device 21 is largely constituted by such as an upstream cylinder 22, a downstream cylinder 26, a filter cylinder 29, a pressure detecting means 36, and a support member 40, which will be described hereinafter.

Figure 5:
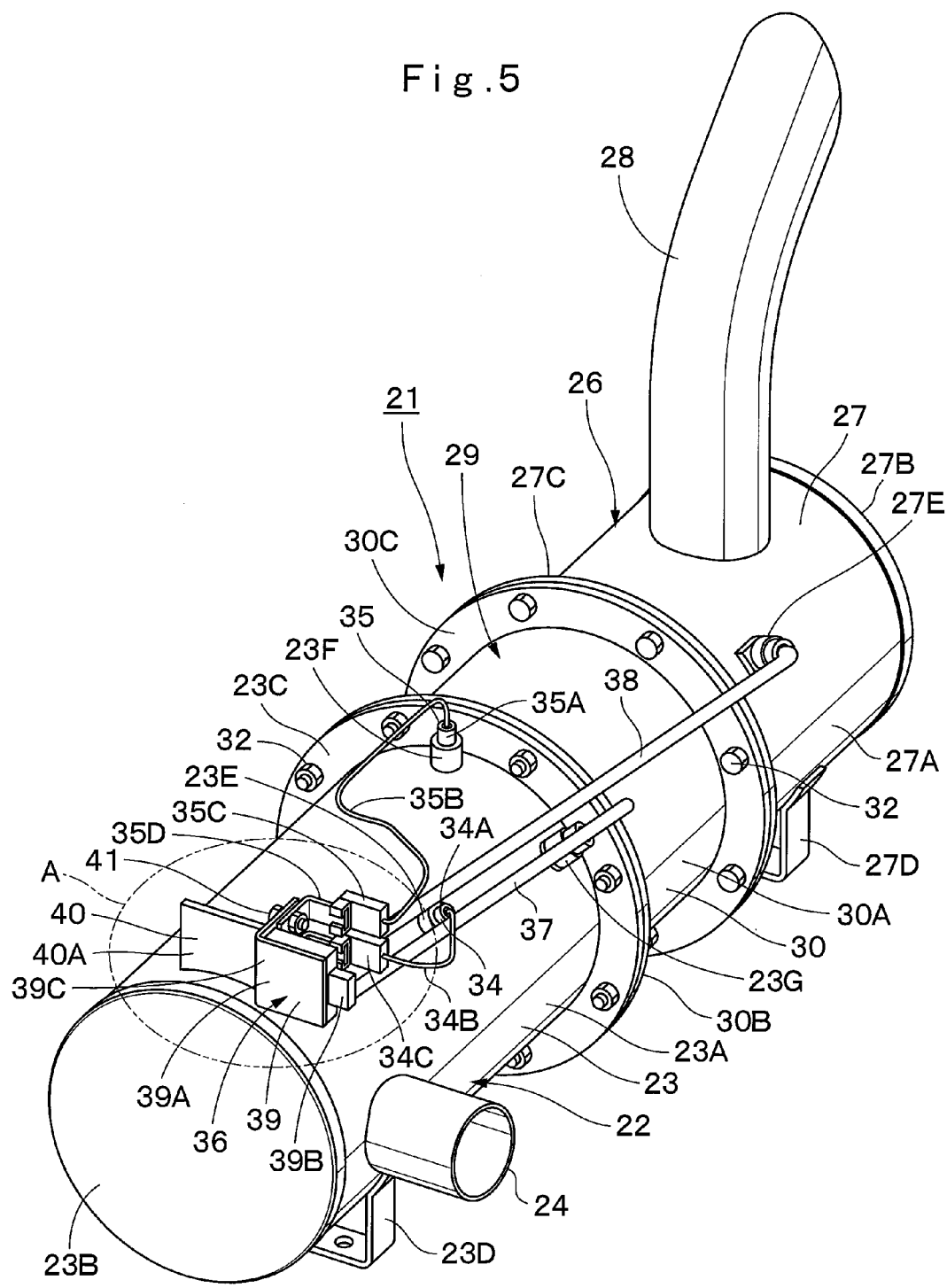
FIG. 5 is a perspective view taken from the engine side and illustrating in enlarged form the exhaust gas purifying device in accordance with the first embodiment.
Figure 9:
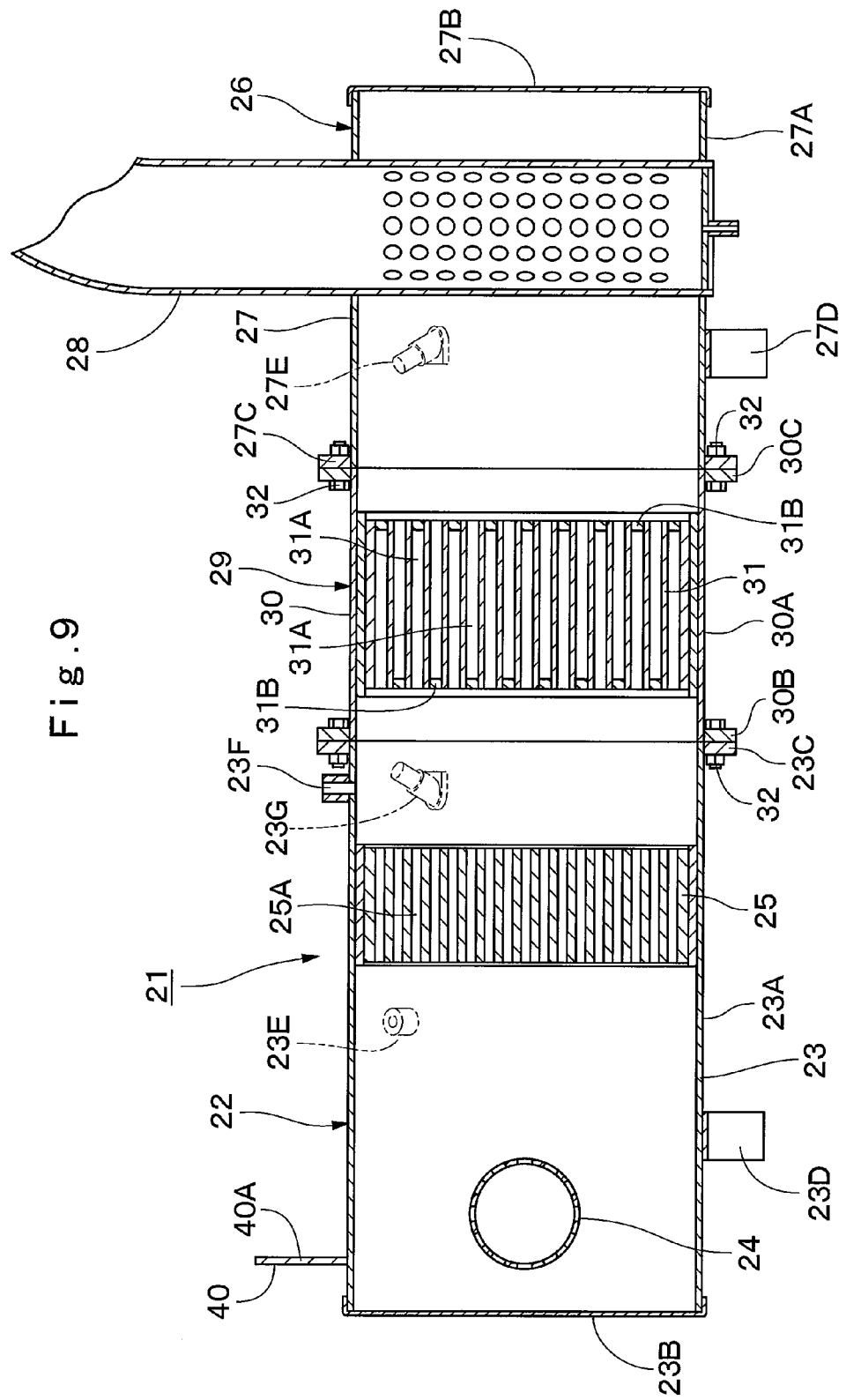
FIG. 9 is a longitudinal sectional view of the internal structure of the exhaust gas purifying device with respective detectors removed.

As shown in FIG. 5, the exhaust gas purifying device 21 is constructed such that three cylinders, namely, the upstream cylinder 22, the downstream cylinder 26, and the filter cylinder 29 to be described later, are fastened together by bolts and nuts 32. In addition, as shown in FIG. 9, an oxidation catalyst 25 is accommodated in the upstream cylinder 22, and a below-described particulate matter removing filter 31 (generally called a diesel particulate filter, and hereafter referred to as the "DPF 31") is accommodated in the filter cylinder 29. Further, the support member 40 for disposing connector portions 34C and 35C of temperature detectors 34 and 35 and a pressure detector 39 at one location in a concentrated manner is provided on the upper surface side of the upstream cylinder 22.

First, designated at 22 is the upstream cylinder which is located on the front side (upstream side) of the exhaust gas purifying device 21 and to which the exhaust pipe 8E is connected. This upstream cylinder 22 constitutes an inlet portion into which the exhaust gas flows. Namely, as shown in FIGS. 5 and 9, the upstream cylinder 22 is largely constituted by a cylindrical member 23, an inlet pipe 24 which is provided on the upstream side of that cylindrical member 23 and to which the exhaust pipe 8E of the engine 8 is connected, and the oxidation catalyst 25 provided in that cylindrical member 23 by being located downstream of that inlet pipe 24.

Denoted at 23 is the cylindrical member constituting the outer shape of the upstream cylinder 22, and the cylindrical member 23 is constituted by a large-diameter cylindrical portion 23A, a lid portion 23B provided so as to close the front side (upstream side) of the cylindrical portion 23A, and a flange portion 23C provided with an enlarged diameter on the rear side (downstream side) of the cylindrical portion 23A.

Here, the flange portion 23C is fixed to a front side flange portion 30B of a cylindrical member 30 for making up the filter cylinder 29 by means of the below-described bolts and nuts 32. In consequence, as shown, for example, in FIG. 6, the filter cylinder 29 is so arranged that it can be removed by being lifted up radially diagonally upward right when the flange portion 23C is unfastened by removing the bolts and nuts 32. Support legs 23D are provided on the cylindrical member 23 by being located on the lower side of the cylindrical portion 23A, and the support legs 23D are fixedly attached to the lateral plate portion 16B of the purifying device mount 16.

Meanwhile, a first temperature detector mounting portion 23E is provided on the cylindrical member 23, on a vicinal position of the upstream side of the internal oxidation catalyst 25, specifically on an axially intermediate portion of the cylindrical portion 23A at a diagonal position inclined toward the engine 8 side. A sensor portion 34A of the below-described first temperature detector 34 is threadedly engaged with this first temperature detector mounting portion 23E, and this first temperature detector mounting portion 23E is formed, for example, by welding a cylindrical body with a female screw cut on its inner peripheral side.

Further, a second temperature detector mounting portion 23F is provided at a position on an upper surface of a downstream end of the cylindrical portion 23A, which is a vicinal position downstream of the oxidation catalyst 25. In substantially the same way as the aforementioned first temperature detector mounting portion 23E, a sensor portion 35A of the below-described second temperature detector 35 is threadedly engaged with this second temperature detector mounting portion 23F, and this second temperature detector mounting portion 23F is formed, for example, by welding a cylindrical body with a female screw cut on its inner peripheral side.

Furthermore, an upstream side pressure pick out portion 23G is provided on the cylindrical member 23 at a downstream end of the cylindrical portion 23A at a diagonal position inclined toward the engine 8 side. This upstream side pressure pick out portion 23G supplies the upstream side pressure of the DPF 31 in the pressure of the exhaust gas flowing in the exhaust gas purifying device 21, and is connected to the below-described pressure detector 39 through an upstream side conduit 37.

Indicated at 24 is the inlet pipe which is provided on the upstream side of the cylindrical portion 23A of the cylindrical member 23. This inlet pipe 24 is constituted by a cylindrical body having a muffling function and penetrating the cylindrical portion 23A in a diametrical direction (lateral direction). The exhaust pipe 8E is connected to its end portion projecting toward the engine 8 side.

Indicated at 25 is the oxidation catalyst which is provided in the upstream cylinder 22, and the oxidation catalyst 25 is provided by being located on the downstream side within the cylindrical member 23 compared with the inlet pipe 24. This oxidation catalyst 25 removes by oxidation harmful substances such as carbon monoxide (CO) and hydrocarbons (HC) contained in the exhaust gas. Further, the oxidation catalyst 25 is formed of a cellular cylindrical body made of, for example, a ceramic, a multiplicity of through holes 25A are formed in its axial direction, and their inner surfaces are coated with a noble metal such as platinum (Pt). Here, as shown in FIG. 9, the oxidation catalyst 25 is disposed by being located between the temperature detector mounting portions 23E and 23F on the cylindrical member 23 and upstream of the pressure pick out portion 23G.

Next, designated at 26 is the downstream cylinder which is provided at a rear side position of the upstream cylinder 22 in a state of sandwiching the below-described filter cylinder 29 therebetween. This downstream cylinder 26 constitutes an outlet portion for the efflux of the exhaust gas. Namely, the downstream cylinder 26 is constituted by a cylindrical member 27 and an outlet pipe 28 which will be described later.

Denoted at 27 is the cylindrical member for constituting the downstream cylinder 26. In substantially the same way as the cylindrical member 23 of the upstream cylinder 22, the cylindrical member 27 is largely constituted by a large-diameter cylindrical portion 27A, a lid portion 27B provided so as to close the rear side (downstream side) of the cylindrical portion 27A, and a flange portion 27C provided with an enlarged diameter on the front side (upstream side) of the cylindrical portion 27A. The flange portion 27C is fixed to a rear side flange portion 30C of the cylindrical member 30 for making up the filter cylinder 29 by means of the bolts and nuts 32. In addition, support legs 27D are provided by being located on the lower side of the cylindrical portion 27A, and the support legs 27D are fixedly attached to the lateral plate portion 16B of the purifying device mount 16.

Further, a downstream side pressure pick out portion 27E is provided on the cylindrical member 27 at an upstream end of the cylindrical portion 27A at a diagonal position inclined toward the engine 8 side. This downstream side pressure pick out portion 27E supplies the downstream side pressure of the DPF 31 in the pressure of the exhaust gas flowing inside the exhaust gas purifying device 21, and is connected to the below-described pressure detector 39 via a downstream side conduit 38.

Indicated at 28 is the outlet pipe which is provided on the downstream side of the cylindrical portion 27A of the cylindrical member 27. This outlet pipe 28 is constituted by a cylindrical body having a muffling function and penetrating the cylindrical portion 27A in a diametrical direction (vertical direction), and its end portion projecting upward is formed as a tail pipe.

Further, designated at 29 is the filter cylinder for removing the particulate matter, which is provided between the upstream cylinder 22 and the downstream cylinder 26. This filter cylinder 29 forms a main body portion of the exhaust gas purifying device 21, and is largely constituted by the cylindrical member 30 and the DPF 31 which will be described later.

Indicated at 30 is the cylindrical member constituting the outer shape of the filter cylinder 29. The cylindrical member 30 is constituted by a cylindrical portion 30A, the front side flange portion 30B provided with an enlarged diameter on the front side (upstream side) of the cylindrical portion 30A, and the rear side flange portion 30C provided with an enlarged diameter on the rear side (downstream side) of the cylindrical portion 30A.

Figure 6:
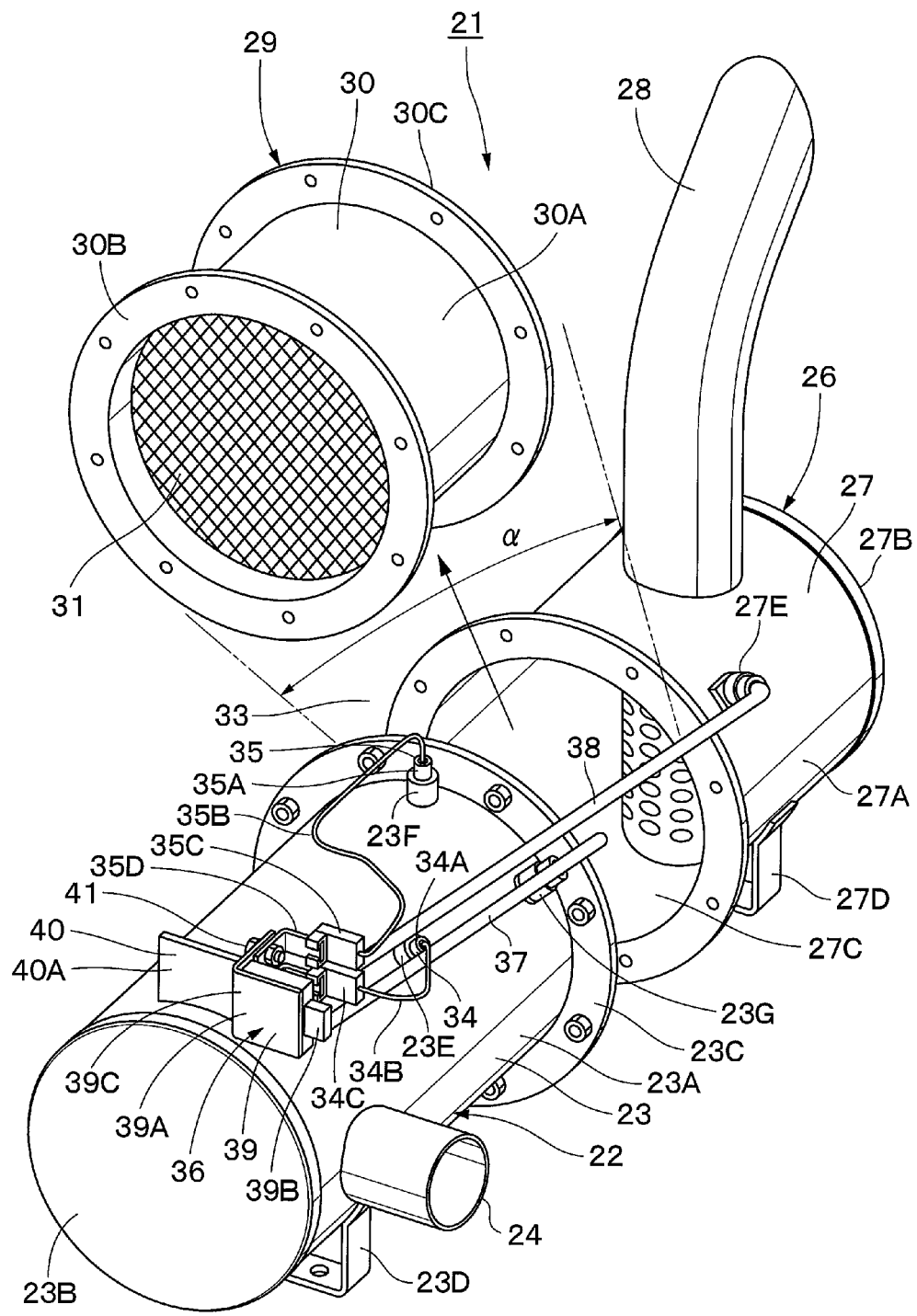
FIG. 6 is an exploded perspective view, taken from a position similar to that of FIG. 5, of a state in which a filter cylinder is removed from an upstream cylinder and a downstream cylinder.
Figure 7:
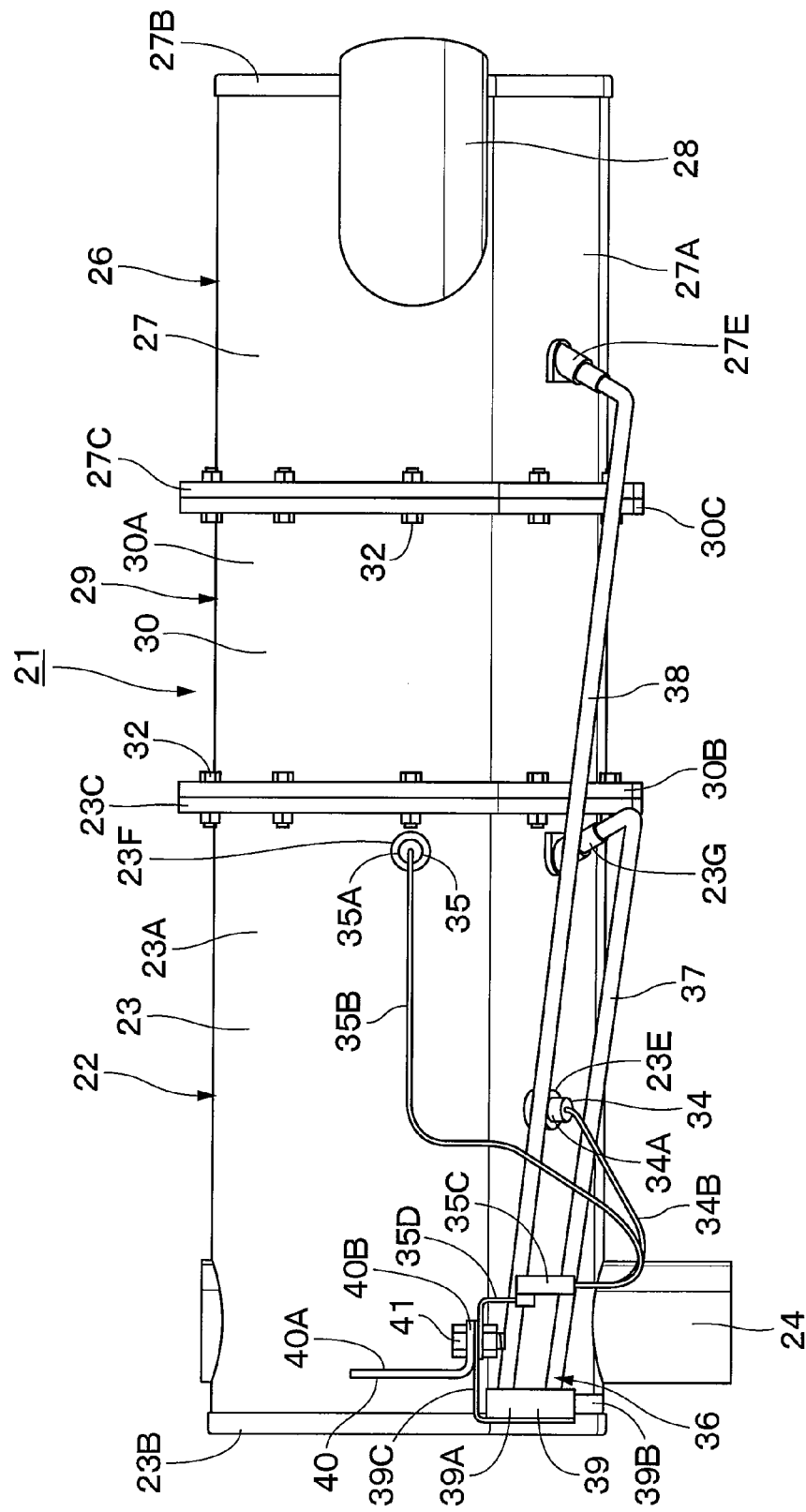
FIG. 7 is a plan view, taken from the upper side, of the exhaust gas purifying device.

As shown in FIG. 6, the cylindrical member 30 can be removed from the purifying device mount 16 and lifted up as a single unit by merely loosening and removing the bolts and nuts 32 without dismounting the mutually adjacent upstream cylinder 22 and the downstream cylinder 26 from the purifying device mount 16, and the cylindrical member 30 can be moved to another workplace for performing a maintenance operation. In addition, the cylindrical member 30 can also be reassembled by being reconnected between the upstream cylinder 22 and the downstream cylinder 26. In this case, as the maintenance operation, it is possible to cite such as a cleaning operation for removing ash accumulated in the DPF 31, an inspection operation for confirming the presence or absence of damage and the like, and a repair operation for effecting the repair of the damaged portion and replacement of parts.

Indicated at 31 is the particulate matter removing filter (diesel particulate filter: DPF) which is accommodated in the cylindrical member 30. The DPF 31 purifies the exhaust gas by capturing the particulate matter (PM) in the exhaust gas emitted from the engine 8.

Further, as shown in FIG. 9, the DPF 31 is formed as a cellular cylindrical body in which a porous member constituted of, for example, a ceramic material is provided with a multiplicity of small diameter passages 31A in the axial direction, and contiguously alternate and different ends of the small diameter passages 31A are respectively closed by sealing members 31B. In consequence, as the exhaust gas flowing into the small diameter passages 31A from one side is passed through the porous material, the DPF 31 captures the particulate matter and causes the purified exhaust gas to flow from the adjacent small diameter passages 31A.

On the other hand, when the upstream side (front side) pressure and the downstream side (rear side) pressure are detected by the below-described pressure detecting means 36, and its pressure difference has reached a predetermined value, namely, when a large amount of particulate matter has been accumulated in the small diameter passages 31A, the DPF 31 removes the particulate matter by burning it. However, even if the particulate matter is burned, part of it is reduced to ash and is gradually deposited in the small diameter passages 31A. In addition, other unburned residues, namely, heavy metals, calcium, and the like in the engine oil, are also gradually deposited. Accordingly, the DPF 31 is so adapted that the filter cylinder 29 is dismounted to remove the deposits.

Indicated at 32 are the bolts and nuts which are provided between the upstream cylinder 22 and the filter cylinder 29 and between the downstream cylinder 26 and the filter cylinder 29, respectively. These bolts and nuts 32 are capable of fastening the flange portion 23C of the upstream cylinder 22 and the front side flange portion 30B of the filter cylinder 29 as well as the flange portion 27C of the downstream cylinder 26 and the rear side flange portion 30C of the filter cylinder 29 in such a manner as to be capable of dismantling them.

Figure 8:
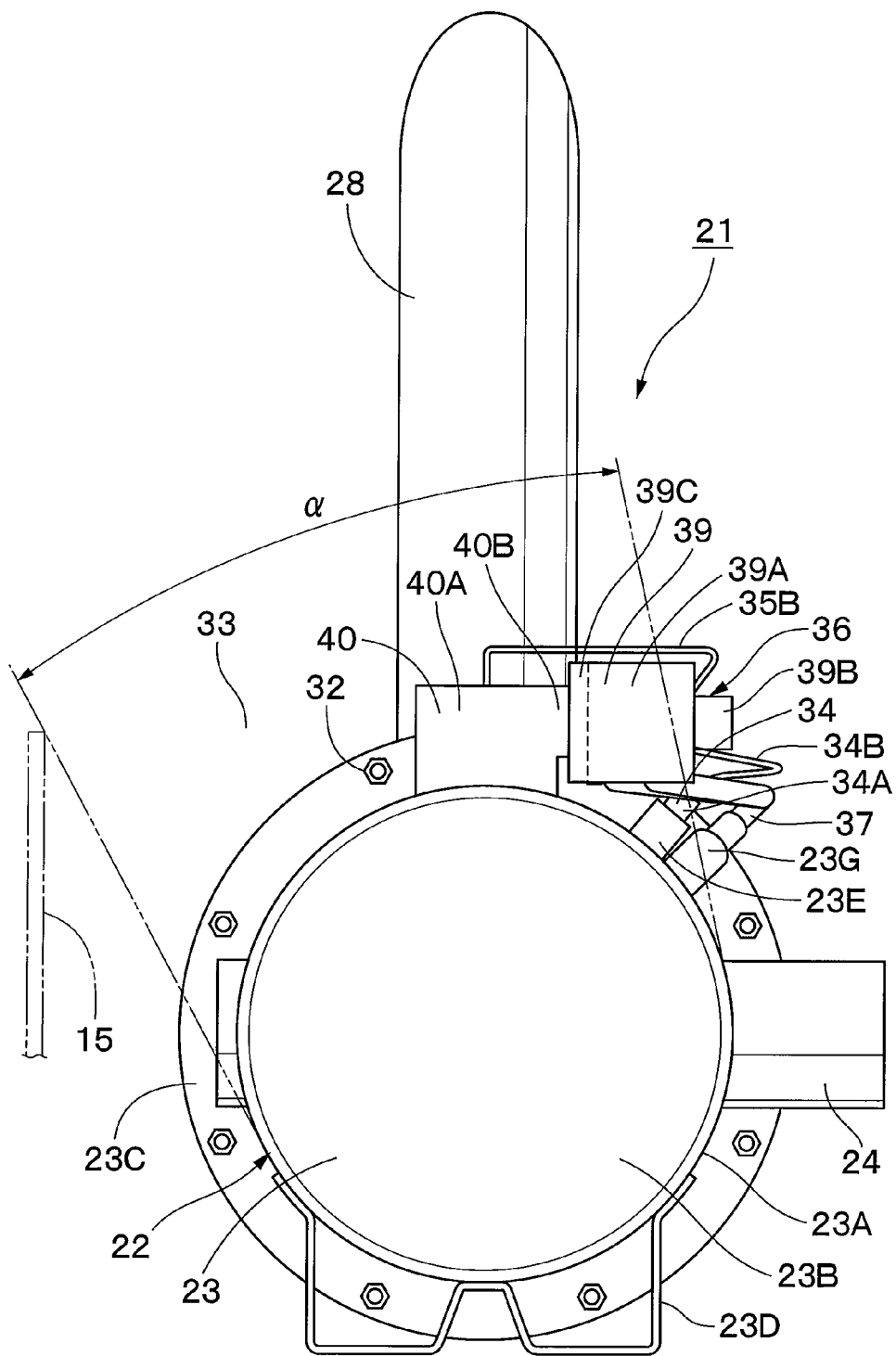
FIG. 8 is a side elevational view, taken from the front side, of the exhaust gas purifying device.

Next, as shown in FIGS. 6 and 8, denoted at 33 is a moving path in cases where the filter cylinder 29 is dismounted from the upstream cylinder 22 and the downstream cylinder 26 and is moved to another location, or the filter cylinder 29 is returned from the other location. This moving path 33 is formed in a vertical space between the engine 8 and the partition member 15, namely, in the range of a fan-shaped angle α having a spread in an upward direction from the filter cylinder 29 toward the partition member 15 (a space sandwiched by two-dot chain lines in FIG. 8).

Here, the moving path 33 can be used as a passage for moving the filter cylinder 29 when the filter cylinder 29 is mounted and dismounted to effect the maintenance operation of the DPF 31. In consequence, the filter cylinder 29 can be dismounted from between the upstream cylinder 22 and the downstream cylinder 26 as a single unit, and the filter cylinder 29 in the dismounted state can be moved to another workplace. In addition, after completion of the operation, the filter cylinder 29 can be returned from the other location to between the upstream cylinder 22 and the downstream cylinder 26.

Meanwhile, the exhaust gas purifying device 21 is provided in the vicinity of the engine 8 so as to be able to treat the particulate matter in the exhaust gas in a high temperature state. For this reason, numerous equipments and parts including the engine 8, the hydraulic pump 10, the partition member 15, the hydraulic piping (not shown), and the like are installed in the surroundings of the exhaust gas purifying device 21. Accordingly, the upstream cylinder 22 is disposed on the front side of the filter cylinder 29, the downstream cylinder 26 is disposed on the rear side thereof, the engine 8 is disposed on the left side thereof, the partition member 15 is disposed on the right side thereof, and the purifying device mount 16 is disposed on the lower side thereof.

In consequence, the place in the vicinity of the engine 8 where the exhaust gas purifying device 21 is disposed is formed as a narrow space where only the upper side is open. However, as the moving path 33 is provided, the filter cylinder 29 can be easily mounted or dismounted even in the narrow space.

Next, a description will be given of the temperature detectors 34 and 35, the pressure detecting means 36, and the like which are provided for detecting whether the exhaust gas purifying device 21 is in a normally function state.

First, denoted at 34 is the first temperature detector mounted on the cylindrical member 23 of the upstream cylinder 22, and the first temperature detector 34 detects the temperature of the exhaust gas flowing into the oxidation catalyst 25 from the inlet pipe 24. As shown in FIGS. 5 to 8, the first temperature detector 34 is largely constituted by the sensor portion 34A mounted on the first temperature detector mounting portion 23E on the cylindrical member 23, a harness 34B having one end connected to the sensor portion 34A, and the connector portion 34C provided at the other end of the harness 34B.

Figure 10:
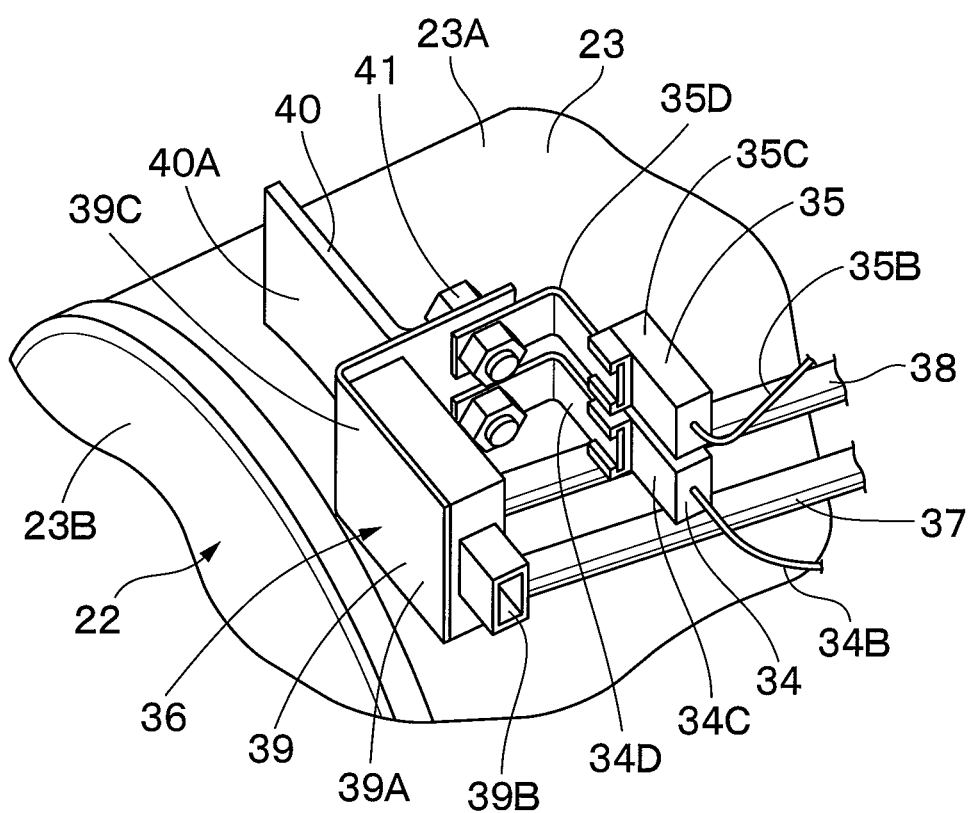
FIG. 10 is a perspective view illustrating in enlarged form a portion A in FIG. 5.
Figure 11:
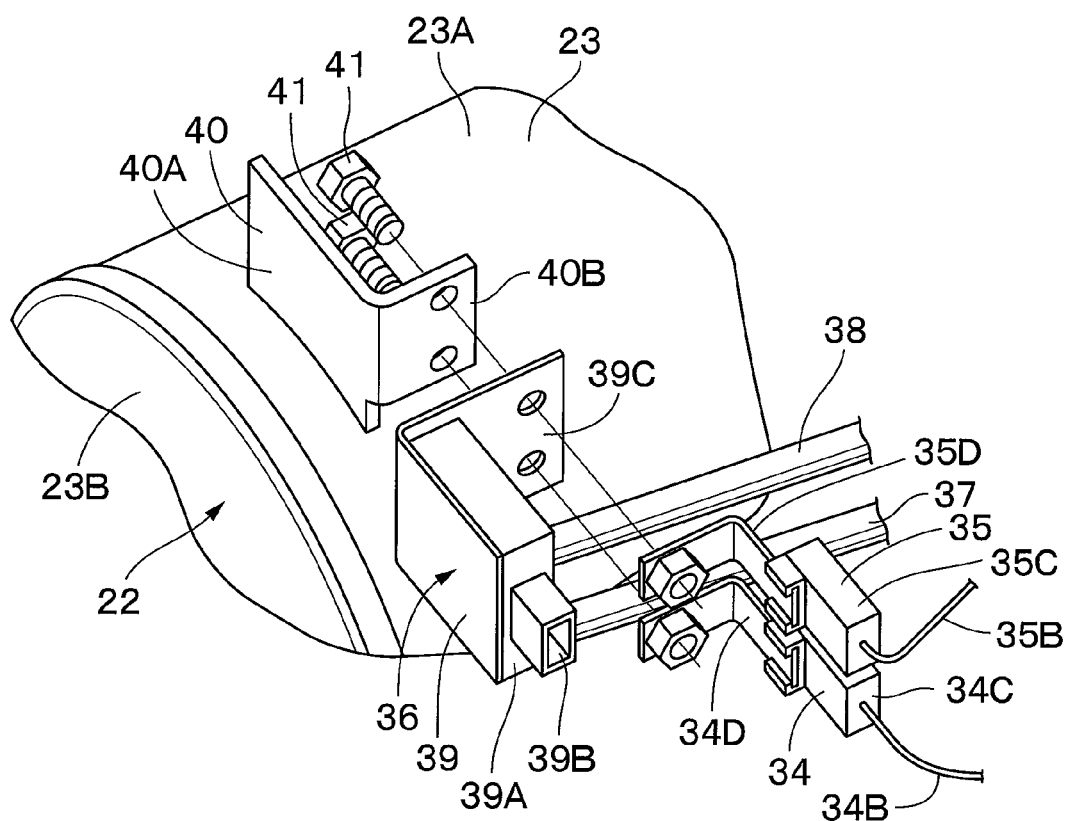
FIG. 11 is an exploded perspective view illustrating a state in which connector portions and a pressure detector are dismounted from a support member shown in FIG. 10.

One of the harnesses (neither is shown) connected to a controller provided on the vehicle body side is detachably fitted to the connector portion 34C. As shown in FIGS. 10 and 11, a substantially L-shaped bracket 34D is attached to the connector portion 34C, and this connector portion 34C is mounted on the below-described support member 40 through this bracket 34D. Further, the first temperature detector 34 detects the temperature of the exhaust gas flowing into the oxidation catalyst 25, so as to confirm whether the oxidation catalyst 25 is at a temperature at which it is capable of developing proper oxidative reaction.

Denoted at 35 is the second temperature detector mounted on the cylindrical member 23 of the upstream cylinder 22, and the second temperature detector 35 detects the temperature of the exhaust gas flowing into the DPF 31 after passing through the oxidation catalyst 25. In addition, in substantially the same way as the above-described first temperature detector 34, the second temperature detector 35 is largely constituted by the sensor portion 35A mounted on the second temperature detector mounting portion 23F on the cylindrical member 23, a harness 35B having one end connected to the sensor portion 35A, and the connector portion 35C provided at the other end of the harness 35B. The connector portion 35C is mounted on the support member 40 through a bracket 35D so as to be located on the upper side of the connector portion 34C of the first temperature detector 34.

Further, the second temperature detector 35 detects the temperature of the exhaust gas flowing into the DPF 31, so as to confirm whether the temperature is at a level at which the particulate matter captured by the DPF 31 can be burned (regenerated).

Meanwhile, denoted at 36 is the pressure detecting means for detecting to what degree the particulate matter has accumulated in the DPF 31, namely, its accumulated state (clogged state). This pressure detecting means 36 is constituted by the upstream side conduit 37, the downstream side conduit 38, and the pressure detector 39.

Indicated at 37 is the upstream side conduit provided between the upstream cylinder 22 and the pressure detector

39. The upstream side conduit 37 leads the pressure within the cylindrical member 23 on the upstream side of the DPF 31 to the pressure detector 39. Further, the upstream side conduit 37 has its base end connected to the upstream side pressure pick out portion 23G of the cylindrical member 23 and its distal end connected to the pressure detector 39.

Indicated at 38 is the downstream side conduit provided between the downstream cylinder 26 and the pressure detector 39. The downstream side conduit 38 leads the pressure within the cylindrical member 27 on the downstream side of the DPF 31 to the pressure detector 39. Further, the downstream side conduit 38 has its base end connected to the downstream side pressure pick out portion 27E of the cylindrical member 27 of the downstream cylinder 26, its midway portion routed along the outer peripheral side of the filter cylinder 29, and its distal end connected to the pressure detector 39 on the upstream cylinder 22.

Here, since the midway portion of the downstream side conduit 38 is radially spaced apart from the filter cylinder 29, as shown in FIG. 6, the midway portion of the downstream side conduit 38 can be disposed at a position offset from the moving path 33 of the filter cylinder 29. Accordingly, the downstream side conduit 38 can be disposed in an unobstructing position when the filter cylinder 29 is mounted or dismounted with respect to the upstream cylinder 22 and the downstream cylinder 26.

Indicated at 39 is the pressure detector provided on the outer peripheral side of the cylindrical member 23 for forming the upstream cylinder 22. The pressure detector 39, together with the connector portions 34C and 35C of the aforementioned temperature detectors 34 and 35, is mounted on the below-described support member 40. This pressure detector 39 detects the front and rear pressures of the DPF 31. Namely, the pressure detector 39 is constituted by, for instance, a piezoelectric element or the like, and detects the pressure (differential pressure) between the upstream side and downstream side of the DPF 31 to measure the accumulated amount of such as the particulate matter and unburned residues in the DPF 31.

Further, the pressure detector 39 is largely constituted by a sensor portion 39A to which the upstream side conduit 37 and the downstream side conduit 38 are connected and by a connector portion 39B which is provided integrally with the sensor portion 39A and to which the harness from the controller is connected to output a detection value. In addition, a bracket 39C is integrally secured to the sensor portion 39A, and this bracket 39C is attached to the support member 40 by use of bolts and nuts 41.

Next, a description will be given of the support member 40 for supporting the connector portions 34C and 35C of the temperature detectors 34 and 35 and the pressure detector 39 to the upstream cylinder 22.

Namely, designated at 40 is the support member in accordance with the first embodiment which is provided on the upstream cylinder 22. This support member 40 is for supporting the connector portion 34C of the first temperature detector 34, the connector portion 35C of the second temperature detector 35, and the sensor portion 39A of the pressure detector 39 at one location in a concentrated manner. The support member 40 is provided upstream of the position of the oxidation catalyst 25, preferably at an upstream end (base end) of the cylindrical member 23. Thereby, since the support member 40 is disposed upstream of the position of the oxidation catalyst 25 which assumes a high temperature, the connector portions 34C and 35C of the temperature detectors 34 and 35 and the pressure detector 39 can be disposed in an upstream side range where the temperature is low.

As shown in FIGS. 5, 9, and 11, the support member 40 is constituted by a vertical plate 40A which is elongated in the left and right directions and is secured to the upper side of the outer peripheral surface of the cylindrical portion 23A through welding means or the like by being located on an upstream portion of the cylindrical member 23, and by a mounting portion 40B formed by bending the left side of the vertical plate 40A rearwardly. The brackets 34D and 35D of the temperature detectors 34 and 35 and the bracket 39C of the pressure detector 39 are mounted on the mounting portion 40B by using the bolts and nuts 41.

As the brackets 34D and 35D of the temperature detectors 34 and 35 and the bracket 39C of the pressure detector 39 are thus mounted on the mounting portion 40B of the support member 40, the connector portions 34C and 35C of the temperature detectors 34 and 35 and the sensor portion 39A of the pressure detector 39 can be supported at one location in a concentrated manner. Further, the connector portions 34C and 35C of the temperature detectors 34 and 35 and the connector portion 39B of the pressure detector 39 can be disposed on the upper portion of the upstream cylinder 22 at positions where they are easy to visually observe and are easily accessible.

The exhaust gas purifying device 21 in accordance with the first embodiment has the above-described construction, and its assembling operation will be described hereinafter. It should be noted that the procedure of the assembling operation is only illustrative and the present invention is not limited to this procedure of the assembling operation.

First, the flange portion 23C for forming the cylindrical member 23 of the upstream cylinder 22 and the front side flange portion 30B for forming the cylindrical member 30 of the filter cylinder 29 are opposed to each other, and the two portions in this state are fastened by use of the bolts and nuts 32. Similarly, the flange portion 27C for forming the cylindrical member 27 of the downstream cylinder 26 and the rear side flange portion 30C for forming the cylindrical member 30 of the filter cylinder 29 are opposed to each other, and the two portions in this state are fastened by use of the bolts and nuts 32.

In consequence, the upstream cylinder 22, the downstream cylinder 26, and the filter cylinder 29 can be assembled in series so as to be positioned substantially coaxially. On the other hand, these cylinders can be disassembled from each other when they are dismounted by loosening the bolts and nuts 32.

Next, the sensor portion 34A of the first temperature detector 34 is threadedly secured to the first temperature detector mounting portion 23E provided on the upstream cylinder 22, and the sensor portion 35A of the second temperature detector 35 is threadedly secured to the second temperature detector mounting portion 23F.

Meanwhile, the base end of the upstream side conduit 37 is connected to the pressure pick out portion 23G of the upstream cylinder 22, and the distal end thereof is connected to the sensor portion 39A of the pressure detector 39. Similarly, the base end of the downstream side conduit 38 is connected to the pressure pick out portion 27E of the downstream cylinder 26, and the distal end thereof is connected to the sensor portion 39A of the pressure detector 39.

Further, the brackets 34D and 35D of the temperature detectors 34 and 35 and the bracket 39C of the pressure detector 39 are fastened together to the mounting portion 40B of the support member 40 by use of the bolts and nuts 41. In consequence, the support member 40 is capable of supporting the connector portions 34C and 35C of the temperature detectors 34 and 35 and the connector portion 39B of the pressure detector 39 in one location of the upper portion of the upstream cylinder 22 in a concentrated manner.

Then, when the exhaust gas purifying device 21 is assembled as described above, this exhaust gas purifying device 21 is placed on the lateral plate portion 16B of the purifying device mount 16. In this state, the support legs 23D of the upstream cylinder 22 and the support legs 27D of the downstream cylinder 26 are fixed to the lateral plate portion 16B by using bolts and nuts (not shown).

In addition, in the state in which the exhaust gas purifying device 21 is mounted on the purifying device mount 16, harnesses linked to the controller mounted on the upper revolving structure 3 are connected to the connector portions 34C and 35C of the temperature detectors 34 and 35 and the connector portion 39B of the pressure detector 39. In this harness connection operation, the harnesses on the vehicle body side can be easily connected since the respective connector portions 34C, 35C, and 39B are disposed in one location of the upper portion of the upstream cylinder 22 in a concentrated manner which is easy to visually observe and is easily accessible. In consequence, the exhaust gas purifying device 21 can be assembled to the purifying device mount 16 (engine 8 side).

The hydraulic excavator 1 in accordance with the first embodiment has the above-described construction, and a description will next be given of its operation.

First, the operator gets on the cab 6 of the upper revolving structure 3 and starts the engine 8 to drive the hydraulic pump 10. Thereby, the pressure oil from the hydraulic pump 10 is supplied to various actuators through a control valve. Further, when the operator who is seated in the cab 6 manipulates the operation lever for traveling, the lower traveling structure 2 can be moved forward or backward. On the other hand, as the operator manipulates the operation lever for work operation, it is possible to perform such as the operation of excavating earth and sand by lowering and raising the working mechanism 4.

During the operation of the engine 8, harmful carbon monoxide, hydrocarbons, particulate matter, and the like contained in the exhaust gas are discharged from the exhaust pipe 8E. Accordingly, the exhaust gas purifying device 21 removes by oxidation the carbon monoxide and hydrocarbons by means of the oxidation catalyst 25 provided in the upstream cylinder 22. At this time, whether or not the temperature of the exhaust gas is at a level suitable for treatment by the oxidation catalyst 25 is detected by the first temperature detector 34. Next, the DPF 31 provided in the filter cylinder 29 is able to capture the particulate matter and the purified exhaust gas can be discharged from the downstream cylinder 26 to the outside.

Meanwhile, when the particulate matter captured by the DPF 31 is accumulated by a predetermined amount, the particulate matter is removed (regenerated) by burning it. At this time, whether or not the temperature of the exhaust gas which has passed through the oxidation catalyst 25 is at a level suitable for treatment by the DPF 31 is detected by the second temperature detector 35. Further, in the case where the particulate matter is burned, ash after burning is gradually accumulated in the DPF 31. For this reason, a cleaning operation for removing the ash accumulated in the DPF 31 becomes necessary.

Accordingly, a description will be given of the case of performing the cleaning operation for removing the ash of the particulate matter accumulated in the DPF 31 of the filter cylinder 29.

In the cleaning operation of the DPF 31, it is necessary to dismount the filter cylinder 29, so that the bolts and nuts 32 fastening the upstream cylinder 22, the downstream cylinder 26, and the filter cylinder 29 are removed. At this time, the filter cylinder 29 is arranged to be fitted to the upstream cylinder 22 and the downstream cylinder 26 by flat flange connection which is free of spigot-like fitting. As a result, the filter cylinder 29 can be easily dismounted from between the upstream cylinder 22 and the downstream cylinder 26 by being merely pulled upward, and the filter cylinder 29 can be taken out to outside the housing cover 14 through the moving path 33.

Meanwhile, the downstream side conduit 38, which is routed along the outer peripheral side of the filter cylinder 29, is disposed at a position offset from the moving path 33 which constitutes the passage of the filter cylinder 26. Thus, although the filter cylinder 29 is provided in a space in which only the upper side is open and which has the narrow, limited fan-shaped angle α, the filter cylinder 29 can be easily moved to a location for performing the cleaning operation, without being obstructed by the downstream side conduit 38.

Further, after the filter cylinder 29 is moved to another workplace, the accumulated ash of the particulate matter can be removed by such as blowing compressed air or the like toward the DPF 31 within the filter cylinder 29.

As such, according to the first embodiment, the construction provided is such that the support member 40 is provided on the cylindrical member 23 of the upstream cylinder 22, and the connector portion 34C of the first temperature detector 34 for detecting the temperature of the exhaust gas flowing from the inlet pipe 24 into the oxidation catalyst 25, the connector portion 35C of the second temperature detector 35 for detecting the temperature of the exhaust gas flowing into the DPF 31 after passing through the oxidation catalyst 25, and the sensor portion 39A of the pressure detector 39 for detecting the front and rear pressures of the DPF 31 are mounted on this support member 40.

Therefore, the support member 40 is capable of supporting the connector portion 34C of the first temperature detector 34, the connector portion 35C of the second temperature detector 35, and the sensor portion 39A of the pressure detector 39 in one location in a concentrated manner.

As a result, when the exhaust gas purifying device 21 is mounted on the upper revolving structure 3, harnesses on the controller side can be easily and accurately connected to the connector portions 34C and 35C of the temperature detectors 34 and 35 and the connector portion 39B of the pressure detector 39 which are disposed in one location in the concentrated manner by means of the support member 40, thereby making it possible to improve the assembly workability.

Further, since the support member 40 is provided on the upper surface side of the cylindrical portion 23A for forming the cylindrical member 23 of the upstream cylinder 22, the connector portions 34C and 35C of the temperature detectors 34 and 35 and the sensor portion 39A and the connector portion 39B of the pressure detector 39 mounted on the support member 40 are easy to visually observe and are easily accessible. In consequence, it is possible to perform wiring operation, inspection operation, repair operation, and the like more easily and accurately.

Furthermore, the support member 40 is provided on the cylindrical member 23 of the upstream cylinder 22 by being located upstream of the position of the oxidation catalyst 25 by avoiding the oxidation catalyst 25 which assumes a high temperature. As a result, the connector portions 34C and 35C of the temperature detectors 34 and 35 and the pressure detector 39 can be disposed in that range of the upstream cylinder 22 where the ambient temperature is low. Therefore, it is possible to prevent the thermal degradation of the connector portions 34C and 35C of the temperature detectors 34 and 35 and the pressure detector 39 and prolong their service lives.

Meanwhile, the construction provided is such that the upstream cylinder 22 and the downstream cylinder 26 are fixedly provided on the purifying device mount 16, and the filter cylinder 29 is detachably provided on the upstream cylinder 22 and the downstream cylinder 26. Accordingly, only the filter cylinder 29 can be dismounted with the upstream cylinder 22 and the downstream cylinder 26 kept mounted on the engine 8 side. In consequence, since only the filter cylinder 29 can be moved to another workplace, it is possible to easily perform the maintenance operation such as the cleaning operation, inspection operation, repair operation, and the like of the DPF 31, thereby making it possible to enhance the workability.

In addition, although the downstream side conduit 38 for constituting the pressure detecting means 36 extends from the downstream cylinder 26 to the upstream cylinder 22 while being routed along the outer peripheral side of the filter cylinder 29, this downstream side conduit 38 is disposed at a position offset from the moving path 33 which constitutes the passage when the filter cylinder 29 is moved. Therefore, even in cases where the filter cylinder 29 is mounted and dismounted for the purpose of maintenance operation, the downstream side conduit 38 does not serve as an obstacle, and there is no need to remove this downstream side conduit 38. As a result, even in a case where the exhaust gas purifying device 21 is accommodated in a narrow space, only the filter cylinder 29 can be easily mounted to and dismounted from the upstream cylinder 22 and the downstream cylinder 26, so that it is possible to easily perform the maintenance operation of the DPF 31 accommodated in the filter cylinder 29.

Furthermore, since the upstream cylinder 22 is provided with the inlet pipe 24 and the oxidation catalyst 25 on and in one cylindrical member 30, it is possible to reduce the number of parts, thereby making it possible to improve the assembly workability, maintenance workability, and the like.

Figure 12:
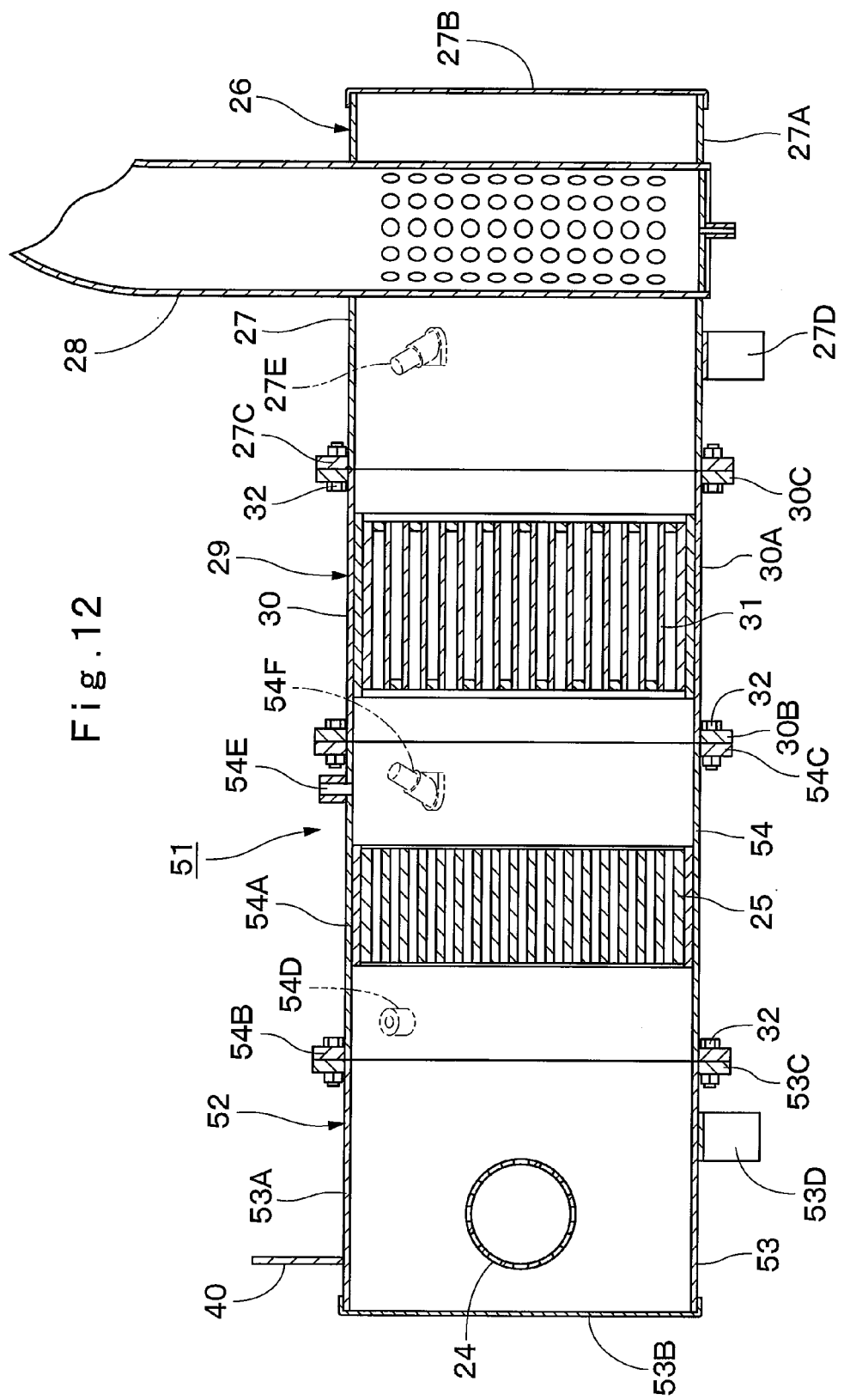
FIG. 12 is a longitudinal sectional view illustrating an exhaust gas purifying device in accordance with a second embodiment of the invention.

Next, FIG. 12 shows an exhaust gas purifying device in accordance with a second embodiment of the present invention. The characteristic feature of this embodiment lies in the construction in which the upstream cylinder is constituted by two axially connected cylindrical members, an inlet pipe which is provided on the first cylindrical member located on the upstream side between the two cylindrical members and to which the exhaust pipe is connected, and an oxidation catalyst which is provided in the second cylindrical member located on the downstream side, and the support member is disposed on the outer peripheral side of the first cylindrical member. It should be noted that, in the second embodiment, those component elements that are identical to those of the foregoing first embodiment will be simply denoted by the same reference numerals to avoid repetitions of similar explanations.

In FIG. 12, designated at 51 is an exhaust gas purifying device in accordance with a second embodiment. Denoted at 52 is an upstream cylinder of the exhaust gas purifying device 51, and the upstream cylinder 52 is constituted by a first cylindrical member 53 on the upstream side (front side), a second cylindrical member 54 connected to the downstream side of that first cylindrical member 53, the inlet pipe 24 provided on the first cylindrical member 53, and the oxidation catalyst 25 provided in the second cylindrical member 54.

Indicated at 53 is the first cylindrical member for making up an upstream side portion of the upstream cylinder 52, and the first cylindrical member 53 is constituted by a cylindrical portion 53A, a lid portion 53B, a flange portion 53C, support legs 53D, and the like in substantially the same way as the cylindrical member 23 in accordance with the first embodiment. Further, the inlet pipe 24 is attached to the cylindrical portion 53A of the first cylindrical member 53 so as to penetrate it in the diametrical direction. The support member 40 is attached to the outer peripheral side of the cylindrical portion 53A.

Indicated at 54 is the second cylindrical member for making up a downstream side portion of the upstream cylinder 52, and the second cylindrical member 54 is connected in series to the downstream side of the first cylindrical member 53. In this case, the second cylindrical member 54 is constituted by a cylindrical portion 54A, a front side flange portion 54B, a rear side flange portion 54C, a first temperature detector mounting portion 54D, a second temperature detector mounting portion 54E, an upstream side pressure pick out portion 54F, and the like. Further, the oxidation catalyst 25 is provided in the cylindrical portion 54A of the second cylindrical member 54, and the oxidation catalyst 25 is disposed between, on the one hand, the first temperature detector mounting portion 54D and, on the other hand, the second temperature detector mounting portion 54E and the upstream side pressure pick out portion 54F.

Further, as for the second cylindrical member 54, the front side flange portion 54B is fastened to the flange portion 53C of the first cylindrical member 53 by use of the bolts and nuts 32, and the rear side flange portion 54C is fastened to the front side flange portion 30B of the cylindrical member 30 of the filter cylinder 29 by using the bolts and nuts 32.

As such, also with the second embodiment thus constructed, it is possible to obtain operational effects substantially similar to those of the above-described first embodiment. In particular, in the second embodiment, only the second cylindrical member 54 can be removed from the first cylindrical member 53 disposed as it is on the purifying device mount 16 on the vehicle body side. Accordingly, it is possible to easily perform the maintenance operation of the oxidation catalyst 25 provided in the cylindrical portion 54A of the second cylindrical member 54.

It should be noted that, in the first embodiment, the flange portions 23C, 27C, 30B, and 30C are respectively provided on the cylindrical member 23 of the upstream cylinder 22, the cylindrical member 27 of the downstream cylinder 26, and the cylindrical member 30 of the filter cylinder 29. Further, the flange portions 23C and 30B as well as the flange portions 27C and 30C which oppose each other are arranged to be fastened to each other so as to be capable of being disassembled by means of the bolts and nuts 32 as fastening members.

However, the present invention is not limited to the same. For example, it is possible to provide a construction in which clamps with a V-shaped cross section are provided which respectively surround the opposing ones of the flange portions 23C, 27C, 30B, and 30C of the upstream cylinder 22, the downstream cylinder 26, and the filter cylinder 29, and these V-shaped clamps are each tightened circumferentially by use of a bolt so as to respectively fasten the opposing ones of the flange portions 23C, 27C, 30B, and 30C. This construction may also be applied to the second embodiment in a similar manner.

Furthermore, in the respective embodiments a description has been given by citing as an example the case in which the exhaust gas purifying device 21 or 51 is installed in the hydraulic excavator 1 equipped with the crawler type lower traveling structure 2. However, the present invention is not limited to the same, and it is possible to adopt a construction in which the exhaust gas purifying device 21 or 51 is installed in a hydraulic excavator equipped with a wheel type lower traveling structure consisting of, for example, tires and the like. In addition to these, the present invention may be extensively applied to other construction machines such as a lift truck, a dump truck, a hydraulic crane, and the like.

The invention claimed is:

1. An exhaust gas purifying device comprising an upstream cylinder connected to an exhaust pipe of an engine mounted on a vehicle body and accommodating an oxidation catalyst for performing oxidation treatment of harmful substances contained in exhaust gas; a downstream cylinder disposed downstream of said upstream cylinder to emit the exhaust gas; a filter cylinder provided between said upstream cylinder and said downstream cylinder and accommodating a filter for capturing particulate matter contained in the exhaust gas;

a temperature detector mounted on said upstream cylinder and constituted by a sensor portion for detecting the temperature of the exhaust gas and a connector portion provided at a distal end portion of a harness extending from said sensor portion; an upstream side conduit which has a base end connected to said upstream cylinder and through which pressure within said upstream cylinder is led; a downstream side conduit which has a base end connected to said downstream cylinder and through which pressure within said downstream cylinder is led; and a pressure detector provided by being connected to a distal end of said upstream side conduit and to a distal end of said downstream side conduit so as to detect front and rear pressures of said filter, and a support member to collectively support said connector portion of said temperature detector and said pressure detector disposed on an outer peripheral side of said upstream cylinder at an upstream position of said oxidation catalyst.

2. An exhaust gas purifying device according to claim 1, wherein said temperature detector comprises a first temperature detector for detecting the temperature of the exhaust gas flowing into said oxidation catalyst and a second temperature detector for detecting the temperature of the exhaust gas flowing into said filter after passing through said oxidation catalyst, and said support member is adapted to support a connector portion of said first temperature detector and a connector portion of said second temperature detector.

3. An exhaust gas purifying device according to claim 1, wherein said downstream side conduit is arranged to extend from said downstream cylinder to said upstream cylinder while being routed along an outer peripheral side of said filter cylinder.

4. An exhaust gas purifying device according to claim 3, wherein said downstream side conduit is arranged to be disposed at a position offset from a moving path which is used when said filter cylinder is dismounted from said upstream cylinder and said downstream cylinder and is moved to another location or is returned from the other location so as to perform maintenance operation of said filter cylinder.

5. An exhaust gas purifying device according to claim 1, wherein said upstream cylinder includes one cylindrical member, an inlet pipe which is provided upstream of said cylindrical member and to which said exhaust pipe is connected, and said oxidation catalyst provided in said cylindrical member by being located downstream of said inlet pipe.

6. An exhaust gas purifying device according to claim 1, wherein said upstream cylinder includes a first cylindrical member located on an upstream side and a second cylindrical member located on a downstream side which are axially connected, an inlet pipe which is disposed on said first cylindrical member and to which said exhaust pipe is connected, said oxidation catalyst being disposed in said second cylindrical member, and said support member being arranged to be disposed on an outer peripheral side of said first cylindrical member.

* * * * *